United States Patent Office 3,186,855
Patented June 1, 1965

3,186,855
MOLD COATING COMPOSITION
Eugene P. Miller, Pueblo, Colo., assignor to The Colorado Fuel and Iron Corporation, Denver, Colo., a corporation of Colorado
No Drawing. Filed Oct. 8, 1962, Ser. No. 229,153
3 Claims. (Cl. 106—38.23)

This is a continuation-in-part of application Serial Number 861,424, filed December 23, 1959.

This invention relates to coating compositions for application to molds such as metal molds for casting various metals, and for application to other metal casting equipment, and has for its object the provision of an improved coating composition.

The coating composition of the invention for application to metal molds comprises as the important or essential components a polysiloxane and a thickening agent in an aqueous system. In one embodiment of the invention the composition may contain finely divided carbon. The polysiloxane has the important function of acting as a wetting or spreading agent to facilitate an even distribution of the coating over the surface of the mold, and also provides thermal protection. The thickening agent not only imparts viscosity to the composition but gives a fine coating on the mold surface.

When carbon is used in the composition the thickening agent acts as a binder for the carbon particles. The carbon performs the function of reducing agent and supplements the action of the polysiloxane in effecting a separation of the casting from the mold.

The composition consisting of polysiloxane and a thickening agent may contain these components over a wide range, varying, say from 1 to 95% of polysiloxane on a dry weight basis, the balance being the thickening agent. Carbon may be added in amounts up to 80% with corresponding reductions in the amounts of either or both of the other components.

The coating composition has a desirable and important thixotropic property which fermentation may destroy. Hence, when the aqueous composition is not used within a period of 72 hours, a suitable fermentation inhibitor should be incorporated within the mixture, such as formaldehyde, salicylic acid, benzoate of soda or the like. The mixture may be packed dry for storage or shipping, and made ready for use by mixing with warm or cold water in an amount such as to form a slurry of the desired viscosity to be applied to the mold and have good coating or covering properties.

The preferred polysiloxane surfactant is a polymeric hydrocarbon substituted polysiloxane containing repeating units of the structure

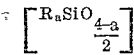

where "a" is an integer having a value of 1 to 2 and "R" represents any hydrocarbon group, preferably a methyl or phenyl group. It is conveniently incorporated in the coating composition in the form of an emulsion in water. Many concentrations of the polysiloxane in the emulsion are usable, but a concentration of 25% or higher is preferred. One commercial polysiloxane

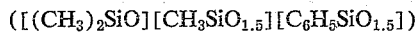

which is a copolymer composed of dimethylsiloxy, methylsiloxy and phenylsiloxy units in equal molar amounts marketed in the form of an emulsion containing 28% by weight of the polysiloxane in water, gives excellent results in the mold composition of the invention. When the ratio of R to Si is about 2, the polysiloxane is an oil. However, the preferred ratio is 1 to 1.7 in which case the polysiloxane is a resin and is especially effective in the compositions of the invention. A preferred specific ratio of R to Si is from 1.2 to 1.4. The composition of the invention includes also the alkali metal salts of the aforementioned polysiloxanes, preferably the sodium and potassium salts. In the following discussion and in the claims reference will be made merely to polysiloxanes but it is to be understood that this term includes also the alkali metal salts. The polysiloxane may be used over a wide range, the limiting amount in the upper range being dictated largely by the cost, for the technical advantages in the upper range do not compensate for the cost of this relatively expensive chemical. Moreover, the thickening agent, and carbon when used, materially improve the properties of the composition.

Various natural binders may be used such as starch, dextrin, cereal flour, or synthetic binders such as acrylamide polymer hydrolytes, hydroxymethyl cellulose, hydroxyethyl cellulose, polyalkylene oxides, for example the polyethylene oxide (Carbowax), polypropylene oxide and similar polymeric thickening agents. The starches derived from potatoes, corn or wheat give excellent results and are preferred for practical and economical advantages. Starch is a particularly effective component of the composition because of the surface it provides and its coaction with silicones. The starch silicone combination gives a very effective coating for use when pouring steel having critical surface requirements.

Various forms of finely divided carbon, such as carbon black, lamp black, graphite, charcoal, coke or coal, may be used in compounding the composition. Activated carbon, including the vegetable or animal charcoal or activated carbon formed from coal may be used where gas adsorbing properties are desired. The carbon black or lamp black carbon are very effective because of their fine state of subdivision and may be used advantageously in the minimum range. The other carbons should be ground to a fine state, for example, to have the screen analysis: 100% minus 120 mesh and 60% minus 200 mesh Tyler Screen Series.

In making up these compositions it is advantageous to use an aqueous emulsion of the polysiloxane, for example, the oily type containing 28% polysiloxane in water. Thus, 10 pounds of the emulsion is expressed as 2.8 pounds of polysiloxane.

The following examples illustrate compositions of the invention:

|  |  | Percent by weight |
|---|---|---|
| (1) | Polysiloxane | 12.3 |
|  | Starch | 87.7 |
| (2) | Polysiloxane | 92.0 |
|  | Starch | 8.0 |
| (3) | Polysiloxane | 60.0 |
|  | Starch | 40.0 |
| (4) | Charcoal | 77.16 |
|  | Starch | 18.52 |
|  | Polysiloxane | 4.32 |
| (5) | Charcoal | 70.28 |
|  | Starch | 24.10 |
|  | Polysiloxane | 5.62 |
| (6) | Charcoal | 16.7 |
|  | Starch | 76.4 |
|  | Polysiloxane | 6.9 |
| (7) | Charcoal | 32.82 |
|  | Starch | 65.64 |
|  | Polysiloxane | 1.54 |
| (8) | Charcoal | 5.5 |
|  | Starch | 89.0 |
|  | Polysiloxane | 5.5 |
| (9) | Charcoal | 14.0 |
|  | Starch | 84.3 |
|  | Polysiloxane | 1.97 |

| | Percent by weight |
|---|---|
| (10) Charcoal | 44.44 |
| Starch | 44.44 |
| Polysiloxane | 11.12 |
| (11) Lamp black | 80.6 |
| Starch | 16.1 |
| Polysiloxane | 3.3 |
| (12) Lamp black | 51.0 |
| Carbowax | 17.0 |
| Polysiloxane | 32.0 |

When a synthetic thickening material, as aforementioned, replaces starch in the foregoing compositions, the amount of the material can be considerably reduced, in which case the percentages of the other components may be used in larger amounts.

The method of compounding the liquid coating composition containing charcoal, starch and polysiloxane is illustrated as follows:

The starch is suspended in an aqueous vehicle and heated to near the boiling temperature, say about 93° C. When that temperature is reached, the heat is removed. The powdered charcoal is then incorporated (e.g., in a muller) into the cooked starch and mixed to a smooth consistency. The polysiloxane emulsion is then thoroughly blended into the mixture. Thereafter a sufficient amount of water is added to give a coating composition of the desired consistency or viscosity.

When forming a composition containing a thickener and polysiloxane only a simple blending operation is required.

The coating composition may be marketed as a dry material or as a concentrated material which is prepared for use by mixing with water, and heating if necessary, to form a slurry having the viscosity, binder qualities and specific gravity making it suitable for use. The composition may be applied to the mold surface by spraying through a nozzle, by brushing or by dipping the mold into the composition and draining off the excess. The compositions may be applied to molds at ambient temperature or to molds at temperatures up to 480° F. The water should be removed by evaporation before casting.

The amount of composition applied to the mold can easily be adjusted to the particular casting conditions. In casting steel ingots varying, say, from 11,600 to 22,400 pounds, the amount of composition slurry applied to the mold may vary from 0.5 to 1.0 gallon.

The coating composition of the invention is particularly adapted for coating steel ladle stopper heads and nozzles. For this purpose it is preferred to use a relatively viscous composition which is brushed on stopper heads and stopper seats in the nozzle block. It very effectively eliminates difficulty in opening stoppers for pouring steel from ladles. It substantially reduces the need for plugging open or use of oxygen lance for opening. This results in a clean metal stream, free of spraying and splattering.

In ingot steel casting operations important improvements have been reported as follows.

(1) Reduction in billet scrap caused by ingot surface defects:

Mill A—tests in the tube mill showed an average reduction in billet scrap tonnage of 70 percent.

Mill B—where billet scrap tonnage normally amounted to 0.5 to 1.0 percent of total production, the losses were reduced to less than 0.1 percent.

(2) Reduction in mold burns:

Mill A—on both molds and ladle stoppers, the number of ingot molds scrapped because of burns was reduced by more than 30 percent.

Mill B—the average number of molds scrapped was reduced by 20 percent.

(3) Elimination of stickers at the stripper:

Mill A and Mill B—both reported that stickers were eliminated.

(4) Uniformity of teeming stream and prevention of frozen stoppers:

Mill A—no frozen stoppers occurred when the head and first two sleeves of the stopper were coated with an extra-rich slurry of the composition. This gave a marked improvement in the uniformity of the hot metal stream during teeming. Better starts and cut-offs were also evident.

(5) No contamination of ingot metal:

Mill A—results of analytical studies on many ingot samples indicated that there was no steel contamination.

Although the composition is especially effective as a coating composition for molds used in casting ferrous metals, it may be used for coating other molds, such as metal molds used in casting zinc or aluminum.

I claim:

1. The aqueous slurry coating composition for metal molds consisting essentially of a mixture on a dry weight basis of from 1 to 32% of a polysiloxane represented by the repeating unit

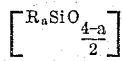

in which "$a$" is an integer having a value of 1 to 2 and R is a hydrocarbon of the group consisting of methyl and phenyl and the ratio of R to Si is from 1.2 to 1.7, carbon of the group consisting of pulverulent coke, coal and charcoal, carbon black and lamp black in an amount varying from 1 to 80%, and the balance substantially a thickening agent of the group consisting of starch, dextrin and cereal flour.

2. An aqueous slurry composition for coating steel ingot molds and the like consisting essentially of the components on a dry weight basis of from 1 to 32% of a polysiloxane represented by the repeating unit

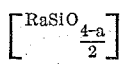

in which "$a$" is an integer having a value of 1 to 2 and R is a hydrocarbon of the group consisting of methyl and phenyl and the ratio of R to Si is from 1.2 to 1.7, from 1 to 80% of finely divided carbon, and the balance a thickening agent of the group consisting of starch, dextrin and cereal flour, acrylamide polymer hydrolyte, hydroxymethylcellulose, hydroxyethylcellulose, polyethylene oxide and polypropylene oxide.

3. The aqueous slurry metal mold coating composition consisting essentially of a dry weight basis from 1.5 to 12% of a polysiloxane represented by the formula

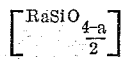

where "$a$" is an integer having a value of 1 to 2 and R a hydrocarbon consisting of methyl and phenyl group, and from 5.5 to 80% of pulverulent charcoal, and the balance substantially starch as a thickening agent.

References Cited by the Examiner

UNITED STATES PATENTS

| | | | |
|---|---|---|---|
| Re. 19,396 | 12/34 | Wallace | 106—38.23 |
| 1,974,477 | 9/34 | Walters | 106—38.23 |
| 2,641,525 | 6/53 | Walter et al. | 106—38.23 |
| 2,755,194 | 7/56 | Volkmann et al. | 106—287 |
| 2,846,323 | 8/58 | Oppliger | 106—287 |

FOREIGN PATENTS 878,969 10/61 Great Britain.

ALEXANDER H. BRODMERKEL, *Primary Examiner.*

MORRIS LIEBMAN, *Examiner.*

UNITED STATES PATENT OFFICE
CERTIFICATE OF CORRECTION

Patent No. 3,186,855                                    June 1, 196

Eugene P. Miller

It is hereby certified that error appears in the above numbered patent requiring correction and that the said Letters Patent should read as corrected below.

Column 4, line 50, after "of" insert -- on --.

Signed and sealed this 19th day of October 1965.

(SEAL)
Attest:

ERNEST W. SWIDER                                   EDWARD J. BRENNER
Attesting Officer                                         Commissioner of Patents